(12) United States Patent
Clement et al.

(10) Patent No.: US 11,604,719 B2
(45) Date of Patent: Mar. 14, 2023

(54) AUTOMATED PROGRAM REPAIR USING STACK TRACES AND BACK TRANSLATIONS

(71) Applicant: MICROSOFT TECHNOLOGY LICENSING, LLC., Redmond, WA (US)

(72) Inventors: Colin Bruce Clement, Seattle, WA (US); Dawn Drain, Bellevue, WA (US); Guillermo Serrato Castilla, Redmond, WA (US); Neelakantan Sundaresan, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 25 days.

(21) Appl. No.: 17/213,193

(22) Filed: Mar. 25, 2021

(65) Prior Publication Data
US 2022/0245056 A1   Aug. 4, 2022

Related U.S. Application Data

(60) Provisional application No. 63/144,259, filed on Feb. 1, 2021.

(51) Int. Cl.
*G06F 11/36* (2006.01)
*G06N 3/08* (2006.01)
*G06N 3/04* (2006.01)

(52) U.S. Cl.
CPC ...... *G06F 11/3636* (2013.01); *G06F 11/3688* (2013.01); *G06N 3/0454* (2013.01); *G06N 3/08* (2013.01)

(58) Field of Classification Search
CPC ............ G06F 11/3636; G06F 11/3688; G06N 3/0454; G06N 3/08
See application file for complete search history.

(56) References Cited

U.S. PATENT DOCUMENTS

| | | | |
|---|---|---|---|
| 10,394,690 B1 | 8/2019 | Potter et al. | |
| 10,585,780 B2* | 3/2020 | Woulfe | G06F 8/33 |
| 10,671,511 B2 | 6/2020 | Sabharwal et al. | |
| 11,048,482 B2* | 6/2021 | Evangelopoulos | G06F 8/71 |
| 2016/0335536 A1* | 11/2016 | Yamazaki | G06N 3/08 |
| 2017/0212829 A1* | 7/2017 | Bales | G06F 11/3612 |

(Continued)

OTHER PUBLICATIONS

Guisheng Fan et al., "Software Defect Prediction via Attention-Based Recurrent Neural Network", 2019, (Year: 2019).*

(Continued)

*Primary Examiner* — Douglas M Slachta

(57) ABSTRACT

An automated program repair system uses a neural transformer model with attention to predict a bug-free version of a method having a source code bug identified in an associated stack trace. The neural transformer model is pre-trained with English language text and the source code of a target programming language. The pre-trained neural transformer model is trained to create synthetic bugs in bug-free methods. The bug-free methods with the synthetic bugs are executed with a test case to obtain a stack trace of the source code bug. The method with the synthetic bug, without the bug, and its stack trace are used to train the neural transformer model to predict repairs for buggy methods.

18 Claims, 8 Drawing Sheets

(56) References Cited

U.S. PATENT DOCUMENTS

| | | | | |
|---|---|---|---|---|
| 2018/0365091 | A1* | 12/2018 | Donaldson | G06N 3/08 |
| 2020/0097389 | A1* | 3/2020 | Smith | G06F 11/3612 |
| 2021/0065053 | A1* | 3/2021 | Higgins | G06K 9/6228 |
| 2021/0103775 | A1* | 4/2021 | Glass | G06F 40/284 |
| 2021/0357307 | A1* | 11/2021 | Deng | G06F 11/3608 |
| 2021/0357762 | A1* | 11/2021 | Clement | G06N 3/088 |

OTHER PUBLICATIONS

Chen, et al., "SEQUENCER: Sequence-to-Sequence Learning for End-to-End Program Repair", In Journal of IEEE Transactions on Software Engineering, Sep. 10, 2019, 17 Pages.

Drain, et al., "DeepDebug: Fixing Python Bugs Using Stack Traces, Backtranslation, and Code Skeletons", In Repository of arXiv:2105.09352v1, May 19, 2021, 11 Pages.

Lutellier, et al., "ENCORE: Ensemble Learning using Convolution Neural Machine Translation for Automatic Program Repair", In Repository of arXiv:1906.08691v1, Jun. 20, 2019, 18 Pages.

Naghshnejad, et al., "Recent Trends in the Use of Deep Learning Models for Grammar Error Handling", In Publication of arXiv Artificial Intelligence, Sep. 4, 2020, 29 Pages.

"International Search Report and Written Opinion Issued in PCT Application No. PCT/US22/012693", dated Mar. 21, 2022, 12 Pages.

Vaswani, et al., "Attention Is All You Need", In Journal of Computing Research Repository, Jun. 12, 2017, 15 Pages.

Allamanis, et al., "Learning to Represent Programs with Graphs", In Repository of arXiv:1711.00740v1, Nov. 1, 2017, pp. 1-16.

Brown, et al., "Language models are few-shot learners", In Journal of Advances in Neural Information Processing Systems, Dec. 6, 2020, pp. 1-75.

Combs, Veronica, "Machine learning tool trains on old code to spot bugs in new code", Retrieved from: https://www.techrepublic.com/article/machine-learning-tool-trains-on-old-code-to-spot-bugs-in-new-code/, May 18, 2020, 6 Pages.

Devlin, et al., "Semantic code repair using neuro-symbolic transformation networks", In Repository of arXiv:1710.11054v1, Oct. 30, 2017, pp. 1-11.

Durieux, et al., "Empirical review of Java program repair tools: a large-scale experiment on 2,141 bugs and 23,551 repair attempts", In Proceedings of the 27th ACM Joint Meeting on European Software Engineering Conference and Symposium on the Foundations of Software Engineering, Aug. 26, 2019, pp. 302-313.

Edunov, et al., "Understanding back-translation at scale", In Proceedings of the Conference on Empirical Methods in Natural Language Processing, Oct. 31, 2018, pp. 489-500.

Gao, et al., "Fixing recurring crash bugs via analyzing Q&A sites", In Proceedings of the 30th IEEE/ACM International Conference on Automated Software Engineering, Nov. 2015, pp. 307-318.

Guo, et al., "GraphCodeBERT: Pre-training Code Representations with Data Flow", In Journal of Computing Research Repository, Sep. 29, 2020, pp. 1-14.

Husain, et al., "CodeSearchNet Challenge: Evaluating the State of Semantic Code Search", In Repository of arXiv:1909.09436v1, Sep. 20, 2019, 6 Pages.

Just, et al., "Defects4j: A database of existing faults to enable controlled testing studies for java programs", In Proceedings of the International Symposium on Software Testing and Analysis, Jul. 21, 2014, pp. 437-440.

Kanade, et al., "Pre-trained contextual embedding of source code", In Repository of arXiv:2001.00059v1, Dec. 21, 2019, pp. 1-22.

Kitaev, et al., "Reformer: The efficient transformer", In Repository of arXiv:2001.04451v1, Jan. 13, 2020, pp. 1-11.

Kiyono, et al., "An Empirical Study of Incorporating Pseudo Data into Grammatical Error Correction", In Proceedings of the Conference on Empirical Methods in Natural Language Processing and the 9th International Joint Conference on Natural Language Processing (EMNLP-IJCNLP), Nov. 2019, pp. 1236-1242.

Lewis, et al., "BART: Denoising Sequence-to-Sequence Pretraining for Natural Language Generation, Translation, and Comprehension", In Proceedings of the 58th Annual Meeting of the Association for Computational Linguistics, Jul. 5, 2020, pp. 7871-7880.

Lin, et al., "QuixBugs: a multi-lingual programs repair benchmark set based on the quixey challenge", In Proceedings Companion of the ACM SIGPLAN International Conference on Systems, Programming, Languages, and Applications Software for Humanity, Oct. 2017, pp. 55-56.

Lutellier, et al., "CoCoNuT: combining context-aware neural translation models using ensemble for program repair", In Proceedings of the 29th ACM SIGSOFT International Symposium on Software Testing and Analysis, Jul. 2020, pp. 101-114.

Mesbah, et al., "DeepDelta: learning to repair compilation errors", In Proceedings of the 27th ACM Joint Meeting on European Software Engineering Conference and Symposium on the Foundations of Software Engineering, Aug. 26, 2019, pp. 925-936.

Pradel, et al., "DeepBugs: A Learning Approach to Name-based Bug Detection", In Journal of Computing Research Repository, May 2018, pp. 1-23.

Qi, et al., "An analysis of patch plausibility and correctness for generate-and-validate patch generation systems", In Proceedings of the International Symposium on Software Testing and Analysis, Jul. 2015, pp. 24-36.

Raffel, et al., "Exploring the Limits of Transfer Learning with a Unified Text-to-Text Transformer", In Repository of ArXiv:1910.10683v1, Oct. 23, 2019, pp. 1-52.

Tufano, et al., "An Empirical Study on Learning Bug-Fixing Patches in the Wild via Neural Machine Translation", In Journal of ACM Transactions on Software Engineering and Methodology, vol. 24, Issue 4, Sep. 2019, 29 Pages.

Tufano, et al., "Learning How to Mutate Source Code from Bug-Fixes". In Journal of Computing Research Repository, Dec. 2018, 12 Pages.

Widyasari, et al., "BugsinPy: a database of existing bugs in Python programs to enable controlled testing and debugging studies", In Proceedings of the 28th ACM Joint Meeting on European Software Engineering Conference and Symposium on the Foundations of Software Engineering, Nov. 2020, pp. 1556-1560.

Wong, et al., "The DStar Method for Effective Software Fault Localization", In Journal of IEEE Transactions on Reliability. Volume: 63, Issue: 1, Mar. 2014, pp. 290-308.

Ye, et al., "A Comprehensive Study of Automatic Program Repair on the QuixBugs Benchmark", In Proceedings of IEEE 1st International Workshop on Intelligent Bug Fixing (IBF), Feb. 24, 2019, 10 Pages.

* cited by examiner

```
self = HobokenApplication (name = 'TestCatchallFilters", ... debug=False)
match = re.compile (b' . *')
func = <function TestCatchallFilters.after_setup, ... <locals>.after_all at 0x7f5f70a81d30> def add_after_filter (self, match, func) :
        filter_tuple = self._build_filter (match, func)
>
E       AttributeError: 'HobokenApplication' object ... has no attribute '_HobokenBaseApplicatin_build_filter' func = <function TestCatchallFilters.after_setup, ... <locals>.after_all at 0x7f5f70a81d30>
match = re.compile (b' . *')
self = HobokenApplication (name ='TestCatchallFilters', ... debug=False)

hoboken/application.py:480:    AttributeError
```

AUTOMATED PROGRAM REPAIR USING STACK TRACES AND BACK TRANSLATIONS

CROSS-REFERENCE TO RELATED APPLICATIONS

The present application claims the benefit of the earlier filed provisional application having Ser. No. 63/144,259 filed on Feb. 1, 2021, which is incorporated by reference in its entirety.

BACKGROUND

During the development of a program or software, a range of measures is taken to ensure that the program is tested prior to the release and distribution of the program. These measures are aimed at reducing the number of source code bugs in the program in order to improve the quality of the program. A source code bug in a source code program is an unintended state in the executing program that results in undesired behavior. Regardless of these measures, the program may still contain bugs.

Software maintenance makes the corrective measures needed to fix software bugs after the bugs are reported by end users. Fixing the software bugs after deployment of the program hampers the usability of the deployed program and increases the cost of the software maintenance services. A better solution would be to detect and fix the software bugs prior to release of the program.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An automated program repair system uses a neural transformer model with attention to predict repaired source code methods given a source code method with a bug and a stack trace identifying the bug. The neural transformer model with attention is pre-trained on natural language text and source code of a target programming language. The neural transformer model with attention is then fine-tuned on repair tasks that include source code with bugs synthetically generated bugs by back translations. During inference, the neural transformer model generates a predicted method without source code bugs for a method having been identified as having a source code and optionally, a stack trace identifying the bug.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 5 is a schematic diagram of an exemplary stack trace for a Python program.

DETAILED DESCRIPTION

Overview

Figure 1A:
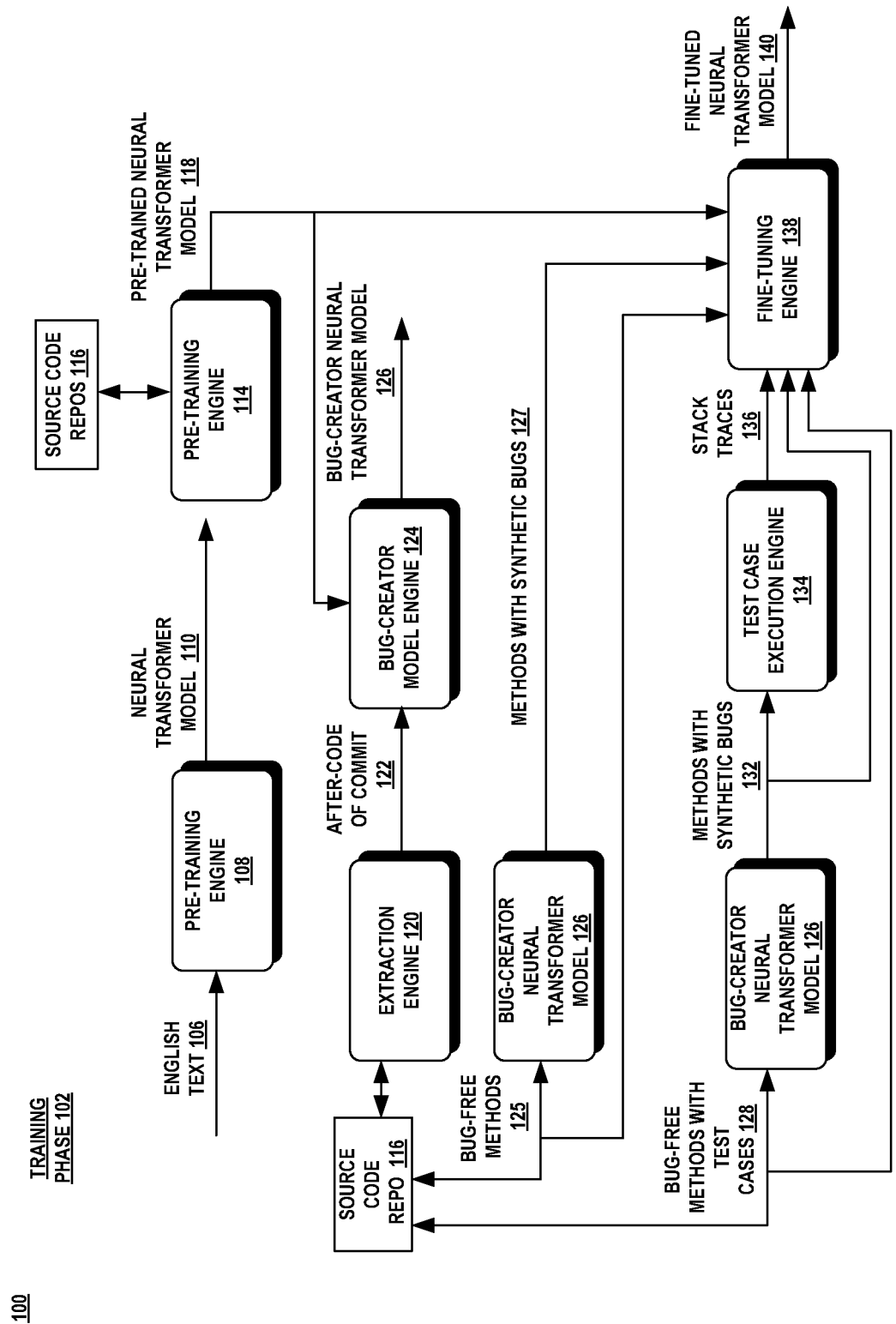
FIGS. 1A and 1B illustrate an exemplary automated program repair system that uses neural transformers with attention to predict repaired programs.

An automated system is disclosed that predicts repaired source code for methods having a source code bug identified from a stack trace. The system utilizes a neural transformer model with attention to predict the repaired method given a source code method with a bug and a stack trace identifying the bug.

The neural transformer model with attention is pre-trained on English language text and on the source code of a target programming language with a masked spanning objective. The pre-training trains the model to learn the syntax and semantics of the target programming language and the English language. The model is then fine-tuned on bug-free methods, an associated method with a synthetic bug, and optionally, a corresponding stack trace to learn to predict the repaired source code method.

There is a large corpus of source code methods not having source code bugs but a limited supply of source code methods with known source code bugs. In order to train the model to learn to recognize source code bugs, a training dataset is needed that contains source code methods with bugs and a corresponding method with the bug repaired. In order to accommodate this shortage, source code methods with synthetic bugs are created to augment the training dataset.

The pre-trained model is used to create a bug-creator neural transformer model by fine-tuning the pre-trained model on the source code of methods having been repaired ("after-code"). Commit data is mined from a version-controlled source code repository for source code methods having had a modification made to repair a bug. The source code having the modification made or reverse commit data is used to train a bug-creator neural transformer model to learn to generate methods with synthetic-generated bugs.

Source code methods without bugs are extracted from a source code repository and applied to the bug-creator model to generate a version of the source code method with a synthetic bug. The methods with synthetic bugs are used to fine-tune the model. Additionally, bug-free methods with test cases are applied to the bug-creator model to generate a version with a synthetic bug. The test case is run to generate a stack trace. The model is then fine-tuned on source code methods having synthetic source code bugs, the corresponding stack trace, and the original bug-free version of the method. The fine-tuned model is then used in software development environments to automatically generate a repaired version of the source code method.

In one aspect, the techniques described herein utilize neural transformers with attention which are one distinct type of machine learning models. Machine learning pertains to the use and development of computer systems that are able to learn and adapt without following explicit instructions, by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The attention mechanism provides the model with a better capability to learn the task at hand thereby generating more accurate predictions for the repaired code.

Attention now turns to a further description of the systems, devices, methods for automated merge conflict resolution with neural transformer models.

Automated Bug Repair System

Figure 1B:
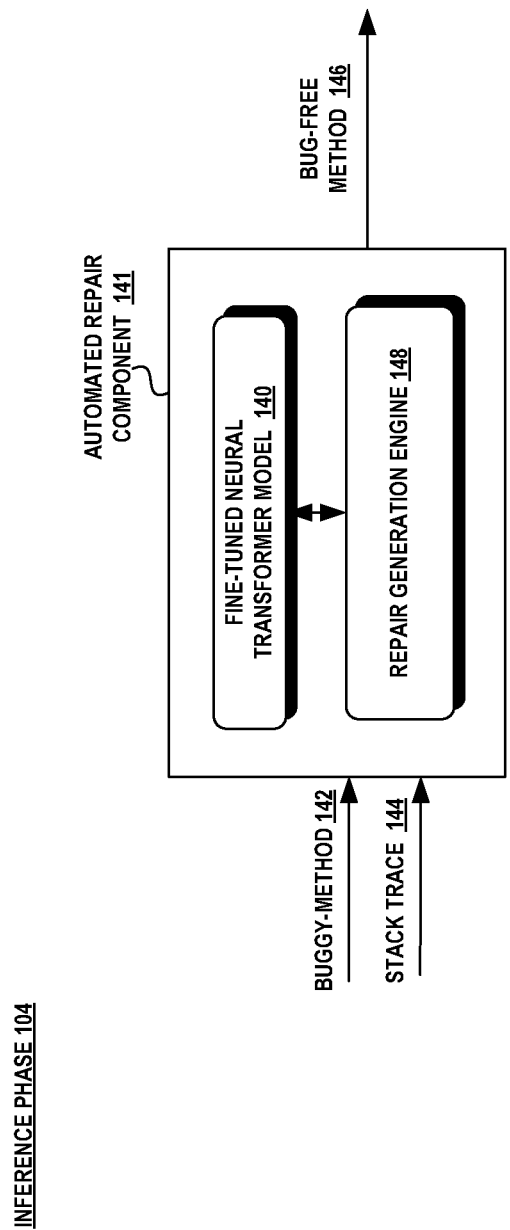

FIGS. 1A-1B illustrate an exemplary system 100 for training a neural transformer model with attention for automated program repair. There is a training phase 102 that trains the model, shown in FIG. 1A, and an inference phase 104, shown in FIG. 1B, where the model is deployed in a target software development environment for program repair.

Turning to FIG. 1A, a pre-training engine 108 trains a neural transformer model with attention on a large corpus of English language text 106 to learn to understand the syntax and semantics of the English language. The English-language trained model 110 is then pre-trained on source code methods of a target programming language producing a pre-trained neural transformer model 118 which also learns the structure and semantics of the target programming language.

The source code methods are obtained from various source code repositories. A source code repository 116 is a file archive that hosts projects having source code files and other data (e.g., scripts, test cases, etc.) shared by multiple developers. A source code repository 116 may be private and internal to an organization, group, enterprise or user or may be publicly-accessible through the Internet. A source code repository 116 may contain source code files from different domains, such as without limitation, scientific computing, web development, dataflow programming, machine learning, and the like. A source code repository 116 may include a version control system that manages changes made to the source code files, such as Git and Mercurial.

An extraction engine 120 obtains commit data from the source code repository. A commit in Git is a command used to save changes made to a source code file to a local repository. A commit message is associated with execution of the commit command and includes a description of the changes, the changed files, the original files before the changes were made, as well as other information and data. The commit command differs from a pull request which is a request to merge one or more commits into a different branch of a repository.

The source code methods having modifications are used by the bug-creator model engine 124 to train a bug-creator neural transformer model 126. The bug-creator neural transformer model 126 is trained on the source code methods having had a bug repaired to learn the edits made to repair the bug which is then used to create synthetic bugs. A synthetic bug is one that is generated by the neural transformer model and not made by a developer.

The bug-creator neural transformer model 126 is then used to create synthetic bugs in bug-free methods that have associated test cases 128. A test case is a set of conditions that are performed on a source code program to verify the functionality of the program. The test cases for a source code method with the synthetic bug is executed to produce a stack trace. A stack trace is generated when a program encounters an error. The stack trace identifies the error name, error message, and lines of source code in a method having an error.

The fine-tuning engine 138 trains the pre-trained neural transformer model 118 on methods with synthetic bugs 127 generated by the bug-creator neural transformer model 126 and their corresponding bug-free method 125.

In addition, the pre-training neural transformer model 118 is fine-tuned, by a fine-tuning engine 138, on the original source code of the bug-free method 128, the version of the original source code method with a synthetic bug 132, and the stack trace from the execution of the method with the synthetic bug 136. From these inputs, the output of the fine-tuning engine 138 is a fine-tuned neural transformer model 140.

Turning to FIG. 1B, in the inference phase 104, an automated repair component 141 utilizes the fine-tuned neural transformer model 140 and a repair generation engine 148 to predict candidate sequences to repair buggy-methods 142 having a stack trace 144. The model 140 is given a method known to have a source code bug 142 and the stack trace from its execution 144 to predict a repaired method without the source code bug 146.

Attention now turns to a more detailed description of the structure of the neural transformer model.

Neural Transformer Model Architecture

Figure 2:
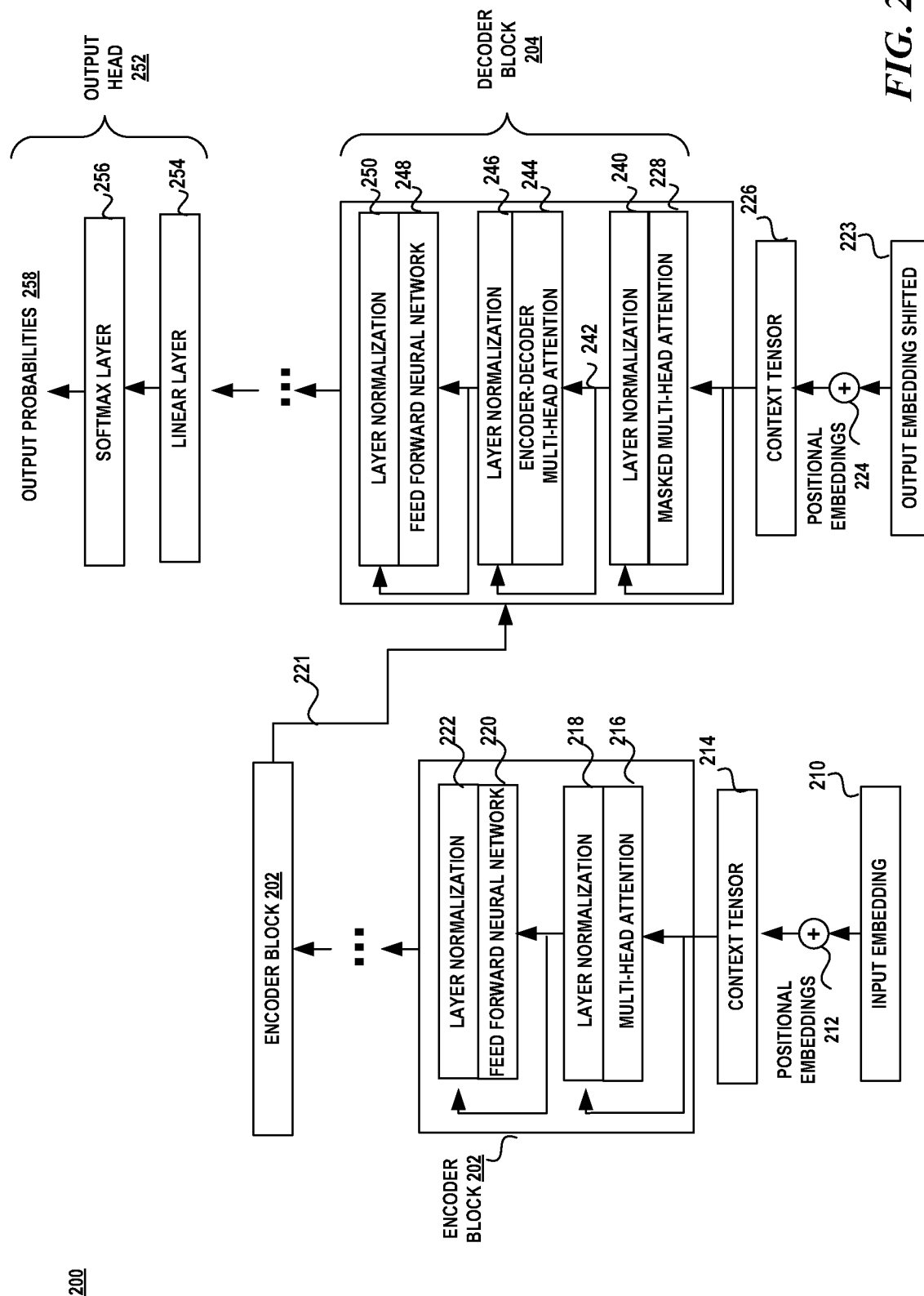
FIG. 2 is a schematic diagram illustrating an exemplary configuration of a neural transformer model.

FIG. 2 shows an exemplary architecture of the neural transformer model. The neural transformer model 200 contains one or more encoder blocks 202 coupled to one or more decoder blocks 204.

The initial inputs to an encoder block 202 are the input embeddings 210 of an input sequence of a training dataset. In order to retain the order of the tokens in the input embedding 210, positional embeddings 212 are added to the input embedding 210 forming a context tensor 214. The initial inputs to the decoder block 204 are a shifted sequence of the output embeddings 223 from a previous time step to which the positional embeddings 224 are added forming context tensor 226.

An encoder block 202 consists of two layers. The first layer includes a multi-head attention component 216 followed by layer normalization component 218. The second layer includes a feed-forward neural network 220 followed by a layer normalization component 222. The context tensor 214 is input into the multi-head attention layer 216 of the first encoder block 202 with a residual connection to the layer normalization component 218. The output of the layer normalization component 218 is input to the feed forward neural network 220 with another residual connection to layer normalization component 222. The output of the encoder block 202 is a set of hidden representations 221. The set of hidden representations 221 is then sent through additional encoder blocks. At the last encoder block, the set of hidden representations 221 is sent to the decoder 204.

Attention is used to decide which parts of the input embedding are important for each token, especially when decoding long sequences since the encoder is limited to encoding a fixed-size vector. Attention mechanisms gather information about the relevant context of a given token and then encode that context into a vector which represents the token. It is used to identity the relationships between tokens in the long sequence while ignoring other tokens that do not have much bearing on a given prediction.

The multi-head attention component 216 takes a context tensor 214 and weighs the relevance of each token represented in the context tensor 214 to each other by generating attention weights for each token in the input embedding 210. In one aspect, the attention function is scaled dot-product attention which is described mathematically as follows:

$$\text{Attention }(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token in a sequence, K is the vector representations of all tokens in the sequence, and V is the vector representations of all the tokens in the sequence.

The queries, keys and values are linearly projected h times in parallel with $d_v$ output values which are concatenated to a final value:

$$\text{MultiHead}(Q,K,V) = \text{Concat}(\text{head}_1, \ldots, \text{head}_h)W^O,$$

where $\text{head}_i = \text{Attention}(QW_i^Q, KW_i^K, VW_i^V)$, with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

In order to reduce the training time of the neural transformer, layer normalization is used between the layers. The layer normalization components 218, 222 normalize the inputs across the features. The mean and standard deviation is computed across the feature dimensions.

The feed-forward neural network 220 processes each output encoding separately. The output of the top encoder block is a set of attention vectors K and V 221 which is used by the encoder-decoder multi-head attention layer 244 of the decoder block 204.

The decoder block 204 predicts each token $t_i$ in the target programming language one-by-one at each time step conditioned on all previously-generated target tokens $t_1, \ldots t_{i-1}$. A decoder block 204 consists of three layers. The first layer includes a masked multi-head attention component 228 followed by a layer normalization component 240. The output of the layer normalization component 240 is input into the encoder-decoder multi-head attention component 244 with a residual connection to layer normalization component 246. The second layer includes an encoder-decoder multi-head attention component 244 followed by a layer normalization component 246. The third layer includes a feed forward neural network 248 followed by a layer normalization component 250. The output of layer normalization component 246 is input into the feed forward neural network 248 with a residual connection to layer normalization component 250.

The masked multi-head attention component 228 receives the output embeddings of the previous timestep. The masked multi-head attention component 228 masks the output embeddings from future time steps. The encoder-decoder multi-head attention layer 244 receives queries from the previous decoder layer and the memory keys and values 221 from the output of the encoder block 202. In this manner, the decoder block 204 can attend to every position of the input sequence. The feed-forward neural network 248 processes each output encoding separately. A layer normalization component 240, 246, 250 is used between the layers in order to normalizes the inputs across the features.

In one aspect, the neural transformer model contains a stack of six encoder blocks and a stack of six decoder blocks which are aggregated into a neural transformer block. The output of each encoder block is passed onto the next encoder block and processed. Each decoder block receives the attention weights computed from the last encoder block. The use of multiple stacked encoder blocks and decoder blocks increases the model's capacity allowing the model to learn increasing levels of abstraction.

Neural Transformer Model Training

Figure 3:
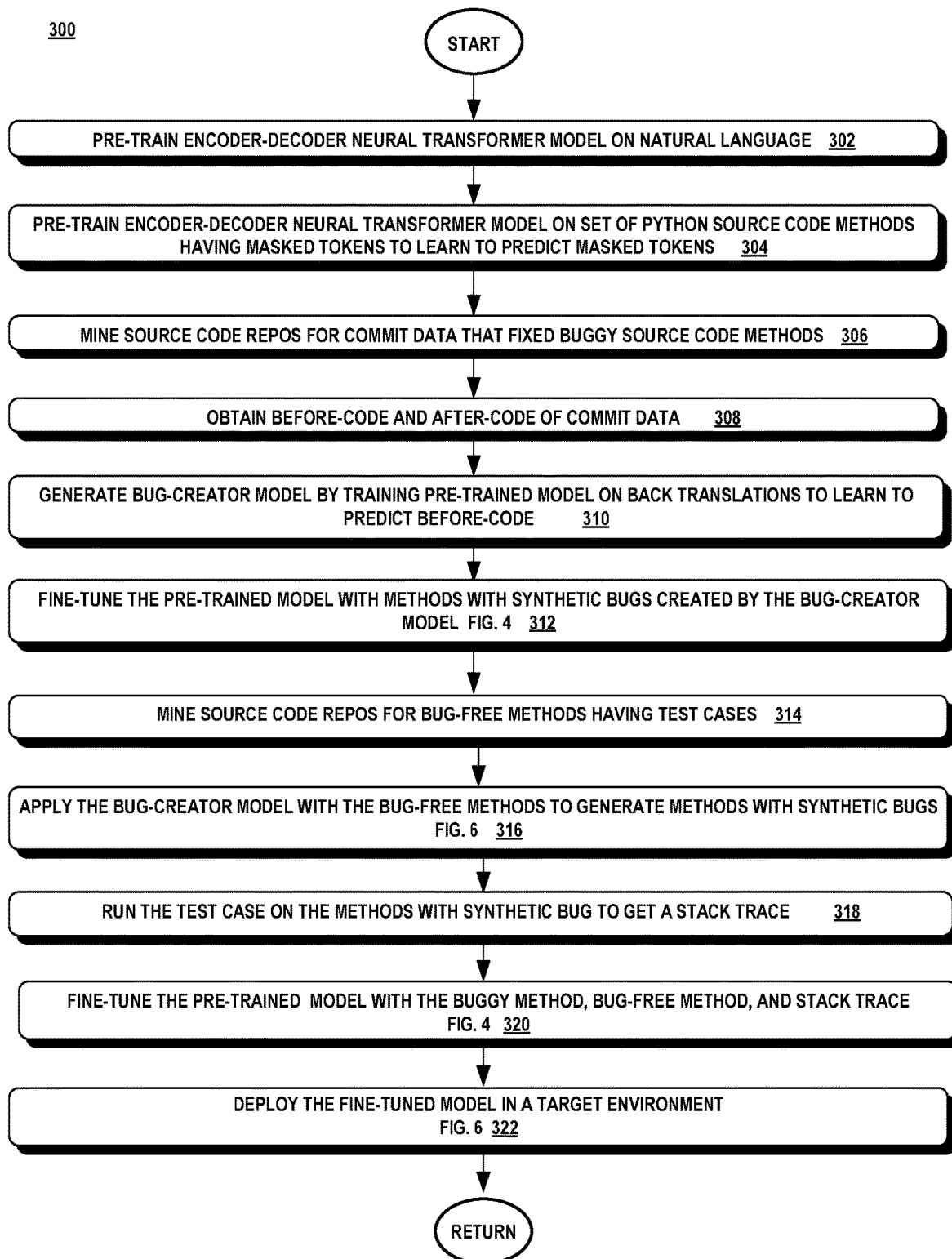
FIG. 3 is a flow diagram illustrating an exemplary method for training the neural transformer model with attention for program repair.

Turning to FIG. 3, there is shown an exemplary method 300 for training neural transformer model an automated program repair system. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

In one aspect, the neural transformer model is built from English language text and the source code of a target programming language. Alternatively, the neural transformer model may be obtained from a pre-existing source and already trained on English language text and a target programming language. (Collectively, block 302).

In one aspect, the order in which the pre-training component trains the neural transformer model is performed by pre-training on the English corpus first and then subsequently pre-training on source code programs. The pre-training on the English corpus first allows the model to learn semantic relationships between words. The subsequent pre-training on source code programs is intended to specialize the model on source code, aiming at learning syntactical properties of the programming language, while retaining semantic knowledge. (Collectively, block 302).

In one aspect, the natural language is English language text. A diverse corpus of unlabeled English text, derived from various sources (e.g., Wikipedia, webtext, and books) is used to obtain sequences of English-language text. A byte-level byte-pair extraction component generates T-ordered sequences of subtokens from each line of English text, where T is the maximum context length. Byte-level byte-pair encoding (BBPE) is used to generate the vocabulary used by the neural transformer model with attention. A text string of natural language text is represented as a sequence of Unicode Transform Format, UTF-8 bytes. The input text string of subtokens is encoded as a sequence of UTF-8 bytes, where a subtoken is encoded into one to four bytes. A byte sequence is then partitioned into byte-level subwords, referred to as byte n-grams. (Collectively, block 302).

The byte-level subwords are generated using the Byte Pair Encoding (BPE) component, which extracts the k most frequently-occurring n-grams. The result is a vocabulary size of the k most frequently-occurring n-grams. An n-gram is a contiguous sequence of n subtokens from an input text string of either source code or natural language text. This type of encoding does not rely on knowing the underlying language making it suitable for an input sequence of text strings that contain source code or natural language text. The ordered sequences of UTF-8 bytes are translated into a T-ordered sequence of subtokens which are vector representations of a natural language text segment. The T-ordered sequence of subtokens is transformed into a context vector. (Collectively, block 302).

A denoising function, such as a span masking function, is then applied to each sequence that randomly masks out a subset of subtokens and the masked span of subtokens is replaced with a mask subtoken, M. The model is trained with the masked sequences to learn to reconstruct the original sequence without the masked subtokens. In one aspect, the mask subtoken replaces a span of subtokens. The number of text spans and the span lengths are randomly generated and each span is replaced with a single mask subtoken. (Collectively, block 302).

The masked denoising is based on the doze task of evaluating human language-learners' proficiency, in which humans are given a foreign language with missing words, and are asked to correctly choose the missing word. The benefit of span-masking denoising in pre-training is that the model learns the desired language in an unsupervised fashion, but also is bi-directional in the sense that it learns the relationships of words both before and after their occurrence. (Collectively, block 302).

Figure 4:
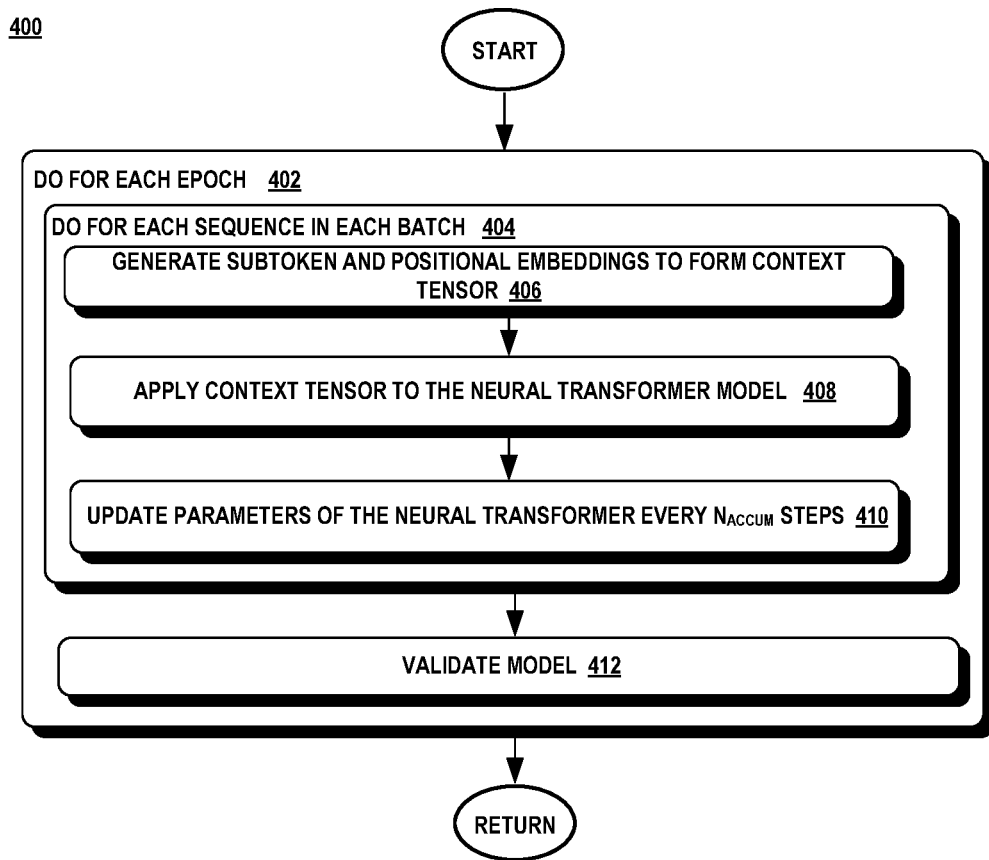
FIG. 4 is a flow diagram illustrating an exemplary method for training the neural transformer model with attention.

Each of the input sequences is transformed into an embedding and applied to the neural transformer model. Turning to FIG. 4, there is shown an exemplary process 400 for applying the pre-training dataset to the neural transformer. Neural transformer models are trained iteratively, making multiple passes over the training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of sequences running through the training process.

The neural transformer model has multiple blocks and layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are learned.

In one aspect, the hyperparameters may include the following: (1) subtoken and position embedding layers of dimensions: 50000×1024, and 1024×1024 respectively; (2) the configuration of the neural transformer model with twelve encoder blocks and twelve decoder blocks; (3) for the training procedure: denoising auto-encoder, with a cross-entropy loss optimization objective; the sequence length of 1024 symbols; a mini-batch size of 8; the gradient accumulation steps for each weight update is 8; the Adam stochastic optimization procedure is used to train the feed forward neural network; and the learning rate is 0.0001; and (4) the vocabulary encoding procedure: byte-level byte-pair encoding; and introduce special control flow tokens to denote separate between buggy code and a stack trace For each sequence of each batch in each epoch (blocks 402, 404), the T-ordered sequences of subtokens are then mapped into numeric vectors and then into respective subtoken embeddings and positional embeddings (block 406).

An embedding is a learned representation for the text-based subtokens where subtokens that have a common meaning have a common representation. An embedding is a mapping of discrete categorical variables to a vector of continuous numbers. There is an embedding for each subtoken in the vocabulary of a particular programming language and a corresponding positional embedding. The subtoken embedding represents the learned representation for the subtoken. The neural transformer model does not read each subtoken sequentially and as such, has no knowledge of the subtoken's position in a sequence without additional position information. The positional embedding is used to encode position information about a subtoken's position in a sequence into the neural transformer model.

Initial values are generated for the subtoken embedding and positional embeddings of each sequence which are then used to form a context tensor. Thereafter, the neural transformer model learns the values for each embedding. Upon the completion of the training phase, the embeddings for each subtoken and the positional embeddings are saved into respective matrices for later use. There is a subtoken embedding matrix, We, that contains an embedding vector for each subtoken $t_i$, i=0 . . . V of a particular programming language, and a positional embedding matrix, Wp, that contains an embedding vector $P_j$, j=0 . . . T, for each position, where V is the size of the vocabulary for a particular programming language and T is the length of the subtoken sequence. (Collectively, block 406).

The first encoder block 202 of the neural transformer model 200 takes the context tensor 214 as input and passes it through the multiple layers of multi-head attention, layer normalization and feed-forward neural network to finally produce a set of hidden representations If there are additional encoder blocks, the output of each encoder block is passed onto the next encoder block with the output of the last encoder block producing the set of hidden representations 221. The set of hidden representations is passed onto each decoder block 204. (Collectively, block 408).

The output head 252 generates output probabilities of each token in the model vocabulary which is used to predict the tokens to replace the masked tokens (block 408).

The decoder blocks 204 of the pre-trained neural transformer model takes a shifted sequence of an output embedding as input. The masking in the masked multi-head attention layer is used to prevent positions from attending to subsequent positions in the future. The masking combined with the output embeddings shifted by one position ensures that the predictions to position T depend only on the known outputs at positions less than T. Starting with the first token of the output sequence, the subtokens are passed through the self-attention and normalization layers and into the encoder-decoder attention layer, serving as the query for encoder-decoder attention, where the key and value pairs for the attention are the outputs of encoder. The encoder output was calculated with the entire input embedding sequence. (Collectively, block 408).

The feed forward neural networks in the encoder blocks 202 and the decoder blocks 204 are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 408).

At the completion of each batch, the parameters of the neural transformer model are updated at a preconfigured frequency denoted as Naccum. Naccum is a gradient accumulation frequency and in one aspect has a value of 8. The parameters include the subtoken embeddings and the positional embeddings which are stored in a respective embedding matrix. (Collectively, block 410).

Next, the neural transformer model is validated. Before the neural transformer model is trained, a set of hyperparameters is selected randomly and then tuned to achieve a desired performance. The neural transformer model is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 412).

Source Code Pre-Training

Turning back to FIG. 3, the neural transformer model is then trained on source code of a target programming language (block 304). In one aspect, the neural transformer model is trained on the methods of the target programming language. Although, this description is described with regards to the Python programming language, it should be understood that the Python programming language is used to illustrate the techniques described herein. The techniques described herein are not limited to any particular programming language.

The pre-training engine 114 generates a pre-training dataset from a corpus of unlabeled source code snippets (e.g., methods, programs, scripts or files) in the target programming language. This is referred to as unsupervised learning since the model draws inferences from the input data without labeled responses. The pre-training engine 114 extracts selected source code files from various source code repositories where the source code is written in the same target programming language. (Collectively, block 304).

The pre-training engine 114 transforms each of the selected source code files into a concrete syntax tree. The pre-training component uses a byte-level byte-pair extraction component to generate T-ordered sequences of subtokens as noted above. A denoising function, such as a span masking function, is then applied to each sequence that randomly masks out a subset of subtokens and the masked span of subtokens is replaced with a mask subtoken, M, as noted above. (Collectively, block 304).

The ordered sequences of source code subtokens are transformed into an embedding and applied to the neural transformer model. The embeddings are applied to the neural transformer model as described above with respect to FIG. 4 resulting in a pre-trained neural transformer model trained on English language and the source code of the target programming language. (Collectively, block 304).

Next, version-controlled source code repositories are mined for commits that were made to repair a source code bug (block 306). A commit includes the before-code and the after-code which are obtained (block 308).

A bug-creator model is trained by fine-tuning the pre-trained neural transformer model with the back translations or after-code of the mined commits The pre-trained neural transformer model learns to predict the corresponding bug-free method from the back translations. The after-code is considered the back translation of the original version of the source code with the source code bug. A back translation, in general, is a translation of the after-code into its corresponding source. In this instance, the back translations are used to train a bug-creator model to learn the edits made that transformed a bug-free method into a method with a synthetic bug. (Collectively, block 310).

Bug-free source code methods are applied to the bug-creator model to create methods with synthetic bugs. The methods with the synthetic bugs are applied to the pre-trained neural transformer model to fine-tune the model with these methods. (Collectively, block 312).

Additionally, source code repositories are mined for bug-free source code having a corresponding test case (block 314). These bug-free methods are then applied to the bug-creator model to generate a corresponding version of the method with a synthetic bug (block 316). The application of the bug-free methods to the bug-creator model is performed as shown and discussed with respect to FIG. 6 below (block 316).

The test case for each of the bug-free methods is then executed with the version of the source code method with the synthetic bug. The execution of the source code method with the synthetic bug produces an error which is captured by a stack trace. (Collectively, block 318).

FIG. 5 illustrates an exemplary stack trace 500 for a Python source code program. A stack trace contains several frames, where each frame is associated with a particular method of the program. The right arrow '>' 502 identifies the line of source code where an error in the program was encountered. The label 'E' 504 is an error message that describes the error. In the example Python code, the stack trace indicates that the error is an AttributeError. The entire stack trace including all frames is used as input to fine-tune the neural transformer model.

Returning back to FIG. 3, the neural transformer model is then fine-tuned with a training dataset that consists of training triplets, where each triplet includes a bug-free method, a version of the method with the synthetic bug, and the corresponding stack trace. Each training tuple is applied to the neural transformer model as shown in FIG. 4 and corresponding description above (block 320).

Upon completion of the training phase, the neural transformer model is deployed in a target environment. In one aspect, the model may be utilized in a source code editor or in a command line editing tool to repair bugs in methods.

Inference Phase

Figure 6:
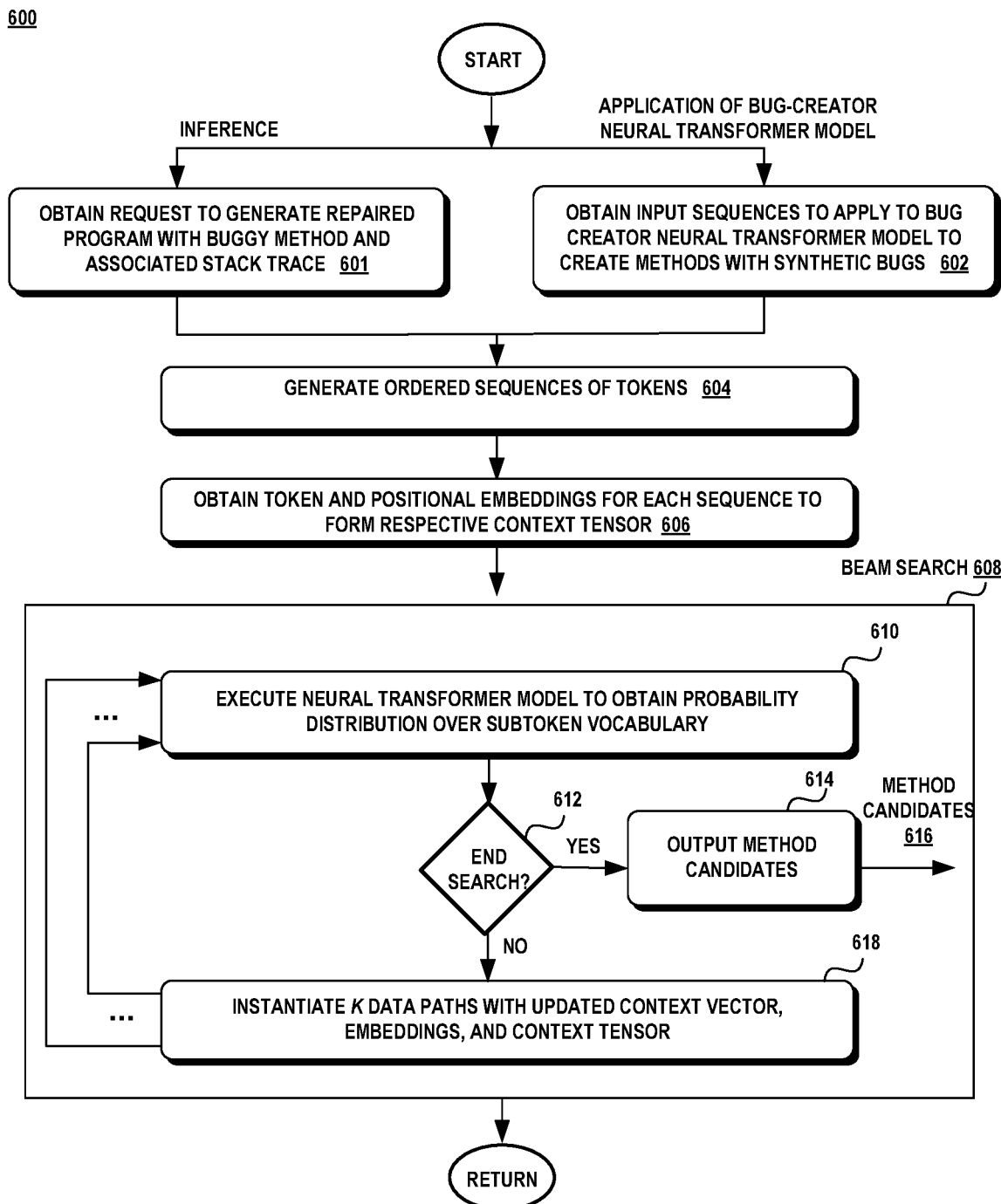
FIG. 6 is a flow diagram illustrating an exemplary method for using the neural transformer model with attention in a beam search to predict candidate methods without source code bugs.

FIG. 6 illustrates an exemplary method 600 of applying the neural transformer model with attention or the bug-creator neural transformer model with attention to predict an output sequence.

In the case of applying the bug creator neural transformer model to generate methods with synthetic bugs, the bug creator neural transformer model receives input sequences of bug-free methods and stack traces (block 602). The methods and the stack traces are parsed into a respective concrete syntax tree. Tokens are extracted from the concrete syntax tree into ordered sequences of subtokens, each of length T (block 604). Subtoken embeddings are obtained for each subtoken of an ordered sequence and the corresponding position embeddings (block 606). The embeddings were learned for each token during the training of the model (block 606).

In the case of the repair generation engine 148 receiving a request to generate a repaired method given a source code method with a known source code bug and its associated stack trace (block 601), the repair generation engine 148 parses the method and the stack trace into a respective concrete syntax tree and extracts tokens from the concrete syntax tree into ordered sequences of subtokens, each of length T (block 604). Subtoken embeddings are obtained for each subtoken of an ordered sequence and the corresponding position embeddings (block 606). The embeddings were learned for each token during the training of the model (block 606).

The decoder's computation at training time may be parallelized using masked self-attention but during inference, the subtokens are generated one token at a time. The neural transformer model factorizes the probability of the target subtokens in an input sequence into a product of conditional probabilities for each subtoken using the formula: $p(t_1, tm|s) = \Pi_{i=1}^{m} p(t_i|t_1, \ldots, t_{i-1}, s)$. During inference, the calculation of the product of the conditional probabilities for each subtoken is complex and extremely time consuming making the model difficult for real-time applications. Beam search is an approximation algorithm that performs faster.

The beam search uses the probability distribution generated by the neural transformer model to identify the top k subtokens likely to be the next subtoken in a method candidate. The beam search expands the search by instantiating new partial sequences using each of the selected subtokens identified by the neural transformer model's probability distribution. The search continues generating new partial sequences from the top k subtokens identified by the output distributions until the search ends. The search may end when the end-of-method token appears as the most probable next subtoken or the maximum length threshold is exceeded. (Collectively, block 608).

A beam search uses a breadth-first search to build a search tree. The search tree is composed of nodes at one or more inference levels. Each node represents a probability distribution generated by the neural transformer model for the subtokens in the model vocabulary. At each level, only the top k subtokens having the highest probabilities from the output distribution generated by the neural transformer model are expanded to the next inference level. The variable k is preconfigured and referred to as the beam width. Each of the k subtokens is then expanded into a search that updates the current translation candidate sequence with the selected subtoken to input into the neural transformer model to generate an additional probability distribution for the next subtoken in a sequence. This process is repeated until the toss end-of-method token appears as the most probable next subtoken or the maximum length threshold is exceeded. (Collectively, block 610)

The beam search 608 uses the neural transformer model with the context tensor to generate a probability distribution for the subtoken vocabulary at each decoder time step (block 610). If the probability distribution indicates that the next likely token is the end-of-method token or the maximum sequence length threshold has been exceeded, then the beam search is finished (block 612—yes) and the method candidates 616 are output (block 614). Otherwise (block 612—no), the top k subtokens to complete a partial sequence are selected (block 618).

Each of the selected subtokens is then input in a respective context vector and has a separate data path through the neural transformer model again. The context vector utilizes the selected subtoken in the current context vector with the last subtoken removed. The new context vector will consist of T subtokens with the selected subtoken $t_o$ added to the beginning of the sequence with the last subtoken removed from the sequence. If the current context vector consists of a subtoken sequence consisting of $t_0, t_1, \ldots, t_T$, then the new context vector will consist of $t_k, t_0, t_1, \ldots, t_{T-1}$. (Collectively, block 618).

Exemplary Operating Environment

Figure 7:
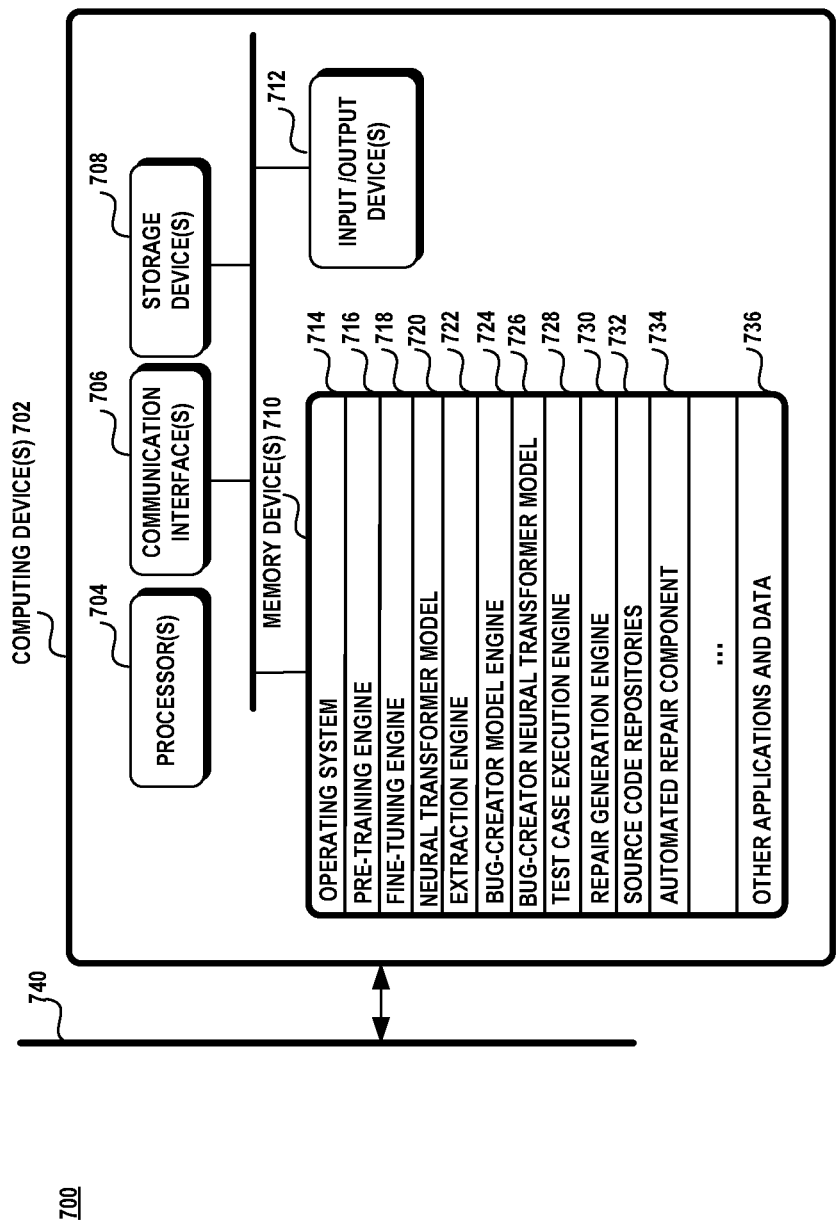
FIG. 7 is a block diagram illustrating an exemplary operating environment.

Attention now turns to a discussion of an exemplary operating environment. FIG. 7 illustrates an exemplary operating environment 700 in which one or more computing devices 702 are used to train and utilize the neural transformer model for program repair. However, it should be noted that the aspects disclosed herein is not constrained to any particular configuration of devices. Computing devices 702 may be configured as a cloud service that generates the neural transformer model as a service and/or offers the repair generation engine with the neural transformer model for program repair. It should be noted that the operating environment is not limited to any particular configuration and other configurations are possible.

A computing device 702 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1400 may be configured in a network environment, a distributed environment, a multi-processor environment, or a stand-alone computing device having access to remote or local storage devices.

The computing device 702 may include one or more processors 704, one or more communication interfaces 706, one or more storage devices 708, one or more input/output devices 712, and one or more memory devices 710. A processor 704 may be any commercially available or customized processor and may include dual microprocessors and multi-processor architectures. A communication interface 706 facilitates wired or wireless communications between the computing device 702 and other devices. A storage device 708 may be computer-readable medium that does not contain propagating signals, such as modulated data signals transmitted through a carrier wave. Examples of a storage device 708 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 708 in the computing device 702. The input/output devices 712 may include a keyboard, mouse, pen, voice input device, touch input device, display, speakers, printers, etc., and any combination thereof.

A memory device or memory 710 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 710 may also include one or more external storage devices or remotely located storage devices that do not pertain to propagated signals, such as modulated data signals transmitted through a carrier wave.

The memory device 710 may contain instructions, components, and data. A component is a software program that performs a specific function and is otherwise known as a module, program, component, and/or application. The memory device 710 may include an operating system 714, a pre-training engine 716, a fine-tuning engine 718, a neural transformer model 720, an extraction engine 722, a bug-creator model engine 724, a bug-creator model 726, a test case execution engine 728, a repair generation engine 730, source code repositories 732, automated repair component 734, and other applications and data 736.

The computing devices 702 may be communicatively coupled via a network 740. The network 740 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 740 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system comprising one or more processors and a memory. The memory stores one or more programs that are configured to be executed by the one or more processors. The one or more programs including instructions to perform acts that: obtain a first neural transformer model with attention to generate a synthetic bug for each of a plurality of source code methods, wherein each of the plurality of source code methods associated with a bug-free version of the source code method; execute each of the plurality of the source code methods with a synthetic bug; obtain a stack trace of each execution; and train a second neural transformer model with attention with each of the plurality of source code methods with a synthetic bug, each of the associated bug-free versions of the source code method, and each associated stack trace, wherein the second neural transformer model is trained to predict a repaired source code method given an input source code method with a source code bug and a stack trace of the input source code method.

In one aspect, the one or more programs include further instructions to perform acts that: pre-train the first neural transformer model with attention on natural language text and source code of a monolingual programming language. In one aspect, the one or more programs include further instructions to perform acts that: train the first neural transformer model with attention on reverse commit data. In one aspect, the one or more programs include further instructions to perform acts that: mine a source code repository for commit operations that repaired a source code bug, the commit operation associated with the reverse commit data.

In one aspect, the one or more programs include further instructions to perform acts that: pre-train the second neural transformer model with attention on natural language text and source code of a monolingual programming language. In one aspect, the one or more programs include further instructions to perform acts that: fine-tune the second neural transformer model with attention with a plurality of source code methods with synthetic bugs created by the first neural transformer model with attention and a corresponding bug-free version. In one aspect, the one or more programs include further instructions to perform acts that: obtain a test case for each of the associated bug-free versions of the source code methods; and execute the test case to produce a stack trace.

A method is disclosed that is performed on a computing device having a processor and a memory, the method, comprising: creating a plurality of source code methods with synthetic source code bugs from a first neural transformer model with attention; generating a stack trace from execution of each of the plurality of source code methods with a synthetic source code bug; and training a second neural transformer model with attention with each of the plurality of bug-free source code methods, each of the source code methods with synthetic source code bug, and each associated stack trace, wherein the second neural transformer model is trained to predict a repaired source code method given an input source code method with a source code bug and a stack trace of the input source code method.

In one aspect, the method further comprises: pre-training the first neural transformer model with attention with natural language text. In one aspect, the method further comprises: pre-training the first neural transformer model with attention on source code of a monolingual programming language using a span masking function. In one aspect, the method further comprises: fine-tuning the first neural transformer model with back translations derived from commit data of a source code repository. In one aspect, the method further comprises: pre-training the second neural transformer model with attention with natural language text.

In one aspect, the method further comprises: pre-training the second neural transformer model with attention with source code of a monolingual programming language using a span masking function. In one aspect, the method further comprises: executing a test case for each of the plurality of source code methods with synthetic source code bug, wherein execution of the test case provides a stack trace for each of the plurality of source code methods with synthetic source code bugs. In one aspect, the method further comprises: fine-tuning the second neural transformer model with attention with each of a plurality of source code methods with a synthetically-generated bug generated from the first neural transformer model with attention.

A device is disclosed comprising at least one processor and a memory. The at least one processor is configured to perform acts that: obtain a stack trace of a source code program having a source code bug; and apply the stack trace and the source code program having the source code bug to a neural transformer model with attention, wherein the neural transformer model with attention generates a version of the source code method with the source code bug repaired. In one aspect, the neural transformer model with attention was pre-trained on English language text and source code in a programming language of the source code program. In one aspect, the neural transformer model with attention was fine-tuned on source code methods having synthetic source code bugs. In one aspect, the synthetic source code bugs were generated from the pre-trained neural transformer model with attention fine-tuned with repaired source code methods. In one aspect, the repaired source code methods were obtained from commit data of source code repositories.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   one or more processors; and
   a memory that stores one or more programs that are configured to be executed by the one or more processors, the one or more programs including instructions to perform acts that:
   obtain a pre-trained neural transformer model with attention that generates source code;
   generate a bug-creator neural transformer model with attention by fine-tuning the pre-trained neural transformer model with attention with back translations, wherein the bug-creator neural transformer model with attention generates a synthetic bug given a source code sample without a source code bug;
   produce a first plurality of synthetic bug samples using the bug-creator neural transformer model with attention given a source code snippet without a source code bug and having an associated test case; and
   create a bug-repair neural transformer model with attention by fine-tuning the pre-trained neural transformer model with attention with each synthetic bug sample of the first plurality of synthetic bug samples, an associated stack trace, and an associated source code snippet without the synthetic bug.

2. The system of claim 1, wherein the one or more programs include further instructions to perform acts that:
   execute the associated test case of each of the synthetic bug samples to produce the associated stack trace for the synthetic bug sample.

3. The system of claim 1, wherein the one or more programs include further instructions to perform acts that:
   train the pre-trained neural transformer model with attention on natural language text.

4. The system of claim 3, wherein the one or more programs include further instructions to perform acts that:
   upon completion of the training of the pre-trained neural transformer model with attention on natural language text, train the pre-trained neural transformer model with attention on source code.

5. The system of claim 4, wherein the training of the pre-trained neural transformer model with attention on source code is performed using a span masking function.

6. The system of claim 1, wherein the one or more programs include further instructions to perform acts that:
   search for commit data that fixed a buggy source code; and
   obtain a back translation of the fixed buggy source code from after-code of the commit data.

7. The system of claim 1, wherein the one or more programs include further instructions to perform acts that:
   generate a second plurality of synthetic bug samples from the bug-creator neural transformer model with attention given a source code snippet with a bug and without a test case; and
   fine-tune the bug-repair neural transformer model with attention on each of the synthetic bug samples of the second plurality of synthetic bug samples and the corresponding bug-free source code snippet.

8. The system of claim 1, wherein the bug-repair neural transformer model with attention includes at least one encoder block coupled to at least one decoder block, wherein the at least one encoder block is configured with an attention layer that precedes a neural network layer, wherein the at least one decoder block is configured with an attention layer that precedes a neural network layer.

9. The system of claim 1, wherein the bug-repair neural transformer model with attention predicts a bug-free version of a source code snippet give the buggy version of the source code snippet and a stack trace.

10. A computer-implemented method, comprising:
    accessing a pre-trained neural transformer model with attention that generates source code;
    generating a bug-creator neural transformer model with attention by fine-tuning the pre-trained neural transformer model with attention with back translations, wherein the bug-creator neural transformer model with attention generates a synthetic bug given a source code sample without a source code bug;
    producing a first plurality of synthetic bug samples using the bug-creator neural transformer model with attention given a source code snippet without a source code bug and having an associated test case; and
    creating a bug-repair neural transformer model with attention by fine-tuning the pre-trained neural transformer model with attention with each synthetic bug sample of the first plurality of synthetic bug samples, an associated stack trace, and an associated source code snippet without the synthetic bug.

11. The computer-implemented method of claim 10, comprising:
    executing the associated test case of each of the synthetic bug samples to produce the associated stack trace for each synthetic bug sample.

12. The computer-implemented method of claim 10, comprising:
    training the pre-trained neural transformer model with attention on natural language text.

13. The computer-implemented method of claim 12, comprising:
    training the pre-trained neural transformer model with attention on source code, upon completion of the training of the pre-trained neural transformer model with attention on natural language text.

14. The computer-implemented method of claim 13, wherein the training of the pre-trained neural transformer model with attention on source code is performed using a span masking function.

15. The computer-implemented method of claim 10, comprising:
   searching for commit data that fixed a buggy source code; and
   obtaining a back translation of the fixed buggy source code from after-code of the commit data.

16. The computer-implemented method of claim 10, comprising:
   generating a second plurality of synthetic bug samples from the bug-creator neural transformer model with attention given a source code snippet with a bug and without a test case; and
   fine-tuning the bug-repair neural transformer model with attention on each of the synthetic bug samples of the second plurality of synthetic bug samples and a corresponding bug-free source code snippet.

17. The computer-implemented method of claim 10, wherein the bug-repair neural transformer model with attention includes at least one encoder block coupled to at least one decoder block, wherein the at least one encoder block is configured with an attention layer that precedes a neural network layer, wherein the at least one decoder block is configured with an attention layer that precedes a neural network layer.

18. The computer-implemented method of claim 10, wherein the bug-repair neural transformer model with attention predicts a bug-free version of a source code snippet give the buggy version of the source code snippet and a stack trace.

* * * * *